US009885262B2

(12) United States Patent
Kim (10) Patent No.: US 9,885,262 B2
(45) Date of Patent: Feb. 6, 2018

(54) CONTINUOUS VARIABLE VALVE DURATION APPARATUS AND ENGINE PROVIDED WITH THE CONTINUOUS VARIABLE VALVE DURATION APPARATUS

(71) Applicants: HYUNDAI MOTOR COMPANY, Seoul (KR); KIA MOTORS CORPORATION, Seoul (KR)

(72) Inventor: Kyung Mo Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 2 days.

(21) Appl. No.: 15/254,459

(22) Filed: Sep. 1, 2016

(65) Prior Publication Data
US 2017/0089229 A1    Mar. 30, 2017

(30) Foreign Application Priority Data

Sep. 25, 2015 (KR) .................. 10-2015-0137069

(51) Int. Cl.
*F01L 1/34* (2006.01)
*F01L 13/00* (2006.01)
*F01L 1/047* (2006.01)
*F02D 13/02* (2006.01)
*F02D 41/00* (2006.01)

(52) U.S. Cl.
CPC .......... *F01L 13/0026* (2013.01); *F01L 1/047* (2013.01); *F02D 13/0207* (2013.01); *F02D 13/0215* (2013.01); *F02D 41/0002* (2013.01); *F02D 13/0219* (2013.01); *F02D 2041/001* (2013.01)

(58) Field of Classification Search
CPC ... F01L 13/0026; F01L 1/047; F02D 13/0207; F02D 13/0215; F02D 13/0219; F02D 41/0002; F02D 2041/001
See application file for complete search history.

(56) References Cited

U.S. PATENT DOCUMENTS 8,245,676 B2 * 8/2012 Yang .................. F01L 13/0026
123/90.16

FOREIGN PATENT DOCUMENTS

JP    2009-236010 A    10/2009
JP    2015-117692 A    6/2015

* cited by examiner

*Primary Examiner* — Zelalem Eshete
(74) *Attorney, Agent, or Firm* — McDermott Will & Emery LLP (57) ABSTRACT

A continuous variable valve duration system includes a camshaft, a first cam portion including a first cam, into which the camshaft is inserted and of which a relative phase angle of the first cam with respect to the camshaft is variable, an inner bracket for transmitting rotation of the camshaft to the first cam portion, a slider housing into which the inner bracket is rotatably inserted, on which a control slot is formed, and the slider housing being rotatable around a pivot shaft, a first rocker arm of which a first end contacts with the first cam and of which a second end is connected to a first valve, a rocker shaft of which the first rocker arm is rotatably connected thereto and of which an eccentric shaft inserted into the control slot is formed thereto, and a control portion for rotating the rocker shaft for the slider housing to be moved with respect to the camshaft.

20 Claims, 13 Drawing Sheets

Phase a　　　Phase b　　　Phase c　　　Phase d

CONTINUOUS VARIABLE VALVE DURATION APPARATUS AND ENGINE PROVIDED WITH THE CONTINUOUS VARIABLE VALVE DURATION APPARATUS

CROSS-REFERENCE TO RELATED APPLICATION

This application claims the benefit of priority to Korean Patent Application No. 10-2015-0137069, filed with the Korean Intellectual Property Office on Sep. 25, 2015, the entire contents of which are incorporated herein by reference.

TECHNICAL FIELD

The present disclosure relates to a continuous variable valve duration apparatus and an engine provided with the continuous variable valve duration apparatus. More particularly, the present disclosure relates to a continuous variable valve duration apparatus an engine provided with the continuous variable valve duration apparatus which may vary an opening duration of a valve according to operation conditions of an engine with a simple construction.

BACKGROUND

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotational speed of the engine. That is, an optimal lift or optimal opening/closing timing of the valves depends on the rotational speed of the engine. In order to achieve such optimal valve operation depending on the rotational speed of the engine, various research, such as designing of a plurality of cams and a continuous variable valve lift (CVVL) that can change valve lift according to engine speed, has been undertaken.

Also, in order to achieve such an optimal valve operation depending on the rotational speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing costs.

The above information disclosed in this Background section is only for enhancement of understanding of the background of the disclosure and therefore it may contain information that does not form the prior art that is already known in this country to a person of ordinary skill in the art.

SUMMARY

Various aspects of the present disclosure are directly providing a continuous variable valve duration apparatus and an engine provided with the same which may vary opening duration of a valve according to operation conditions of an engine, with a simple construction.

A continuous variable valve duration apparatus according to various aspects of the present disclosure may be applied to an SOHC engine so as to reduce weight of the engine and driving resistance.

A continuous variable valve duration system according to various exemplary embodiments of the present disclosure may include a camshaft, a first cam portion including a first cam, into which the camshaft is inserted and of which a relative phase angle of the first cam with respect to the camshaft is variable, an inner bracket transmitting rotation of the camshaft to the first cam portion, a slider housing into which the inner bracket is rotatably inserted, on which a control slot is formed, and the slider housing rotatable around a pivot shaft, a first rocker arm of which a first end contacts with the first cam and of which a second end is connected to a first valve, a rocker shaft of which the first rocker arm is rotatably connected thereto and of which an eccentric shaft inserted into the control slot is formed thereto and a control portion configured to rotate the rocker shaft for the slider housing to be moved with respect to the camshaft.

A first and a second slot may be formed to the inner bracket, and the first cam portion may include a first wheel on which a first wheel key is formed and connected to the first cam, and wherein the continuous variable valve duration system may further include a second wheel on which a second wheel key is formed and connected to the camshaft, a first slider pin on which a first pin hole where the first wheel key is slidably inserted thereto along a length direction of the first wheel key is formed and the first slider pin is rotatably inserted into the first slot and a second slider pin on which a second pin hole where the second wheel key is slidably inserted thereto along a length direction of the second wheel key is formed and the second slider pin is rotatably inserted into the second slot.

The continuous variable valve duration system may further include a bearing disposed between the slider housing and the inner bracket.

The control portion may include a control gear connected to the rocker shaft and a control motor configured to selectively rotate the control gear.

The continuous variable valve duration system may further include a first bridge connected to the second end of the first rocker arm, wherein two first valves may be connected to the first bridge.

The continuous variable valve duration system may further include a first roller connected to the first end of the first rocker arm and contacting the first cam.

The continuous variable valve duration system may further include an outer shaft into which the camshaft is inserted, and wherein the first cam may be connected to the outer shaft.

The continuous variable valve duration system may further include a second cam portion including a second cam rotating with the same phase angle of the camshaft and a second rocker arm rotatably connected to the rocker shaft, a first end of which contacts the second cam and a second end which is connected with a second valve.

The continuous variable valve duration system may further include a second bridge connected to the second end of the second rocker arm, wherein two second valves may be connected to the second bridge.

The continuous variable valve duration system may further include a second roller connected to the first end of the second rocker arm and contacting the second cam.

The continuous variable valve duration system may further include an outer shaft on which a guide slot is formed and into which the camshaft is inserted, and wherein a cam pin may be connected to the second cam and the cam pin is inserted into the guide slot for guiding rotation of the second cam, and the first cam may be connected to the outer shaft.

An engine according to various exemplary embodiments of the present disclosure may include a camshaft, a first cam portion including a first cam, into which the camshaft is inserted and of which a relative phase angle of the first cam with respect to the camshaft is variable, an inner bracket transmitting rotation of the camshaft to the first cam portion, a slider housing into which the inner bracket is rotatably inserted, on which a control slot is formed, and the slider housing rotatable around a pivot shaft mounted to a cylinder head, a first rocker arm of which a first end contacts with the first cam and of which a second end is connected to a first valve, a rocker shaft of which the first rocker arm is rotatably connected thereto and of which an eccentric shaft inserted into the control slot is formed thereto and a control portion configured to rotate the rocker shaft for the slider housing to be moved with respect to the camshaft.

A first and a second slot may be formed to the inner bracket, and the first cam portion may include a first wheel on which a first wheel key is formed and connected to the first cam, and wherein the engine may further include a second wheel on which a second wheel key is formed and connected to the camshaft, a first slider pin on which a first pin hole where the first wheel key is slidably inserted thereto along a length direction of the first wheel key is formed and the first slider pin is rotatably inserted into the first slot and a second slider pin on which a second pin hole where the second wheel key is slidably inserted thereto along a length direction of the second wheel key is formed and the second slider pin is rotatably inserted into the second slot.

The engine may further include a bearing disposed between the slider housing and the inner bracket.

The control portion may include a control gear connected to the rocker shaft and a control motor configured to selectively rotate the control gear.

The engine may further include a first bridge connected to the second end of the first rocker arm, wherein two first valves may be connected to the first bridge.

The engine may further include an outer shaft on which a guide slot is formed and into which the camshaft is inserted, and wherein the first cam is connected to the outer shaft.

The engine may further include a second cam portion including a second cam connected to the camshaft through the guide slot and a second rocker arm rotatably connected to the rocker shaft, a first end of which contacts the second cam and a second end which is connected with a second valve.

The engine may further include a second bridge connected to the second end of the second rocker arm, wherein two second valves may be connected to the second bridge.

The engine may further include a first roller connected to the first end of the first rocker arm and contacting the first cam and a second roller connected to the first end of the second rocker arm and contacting the second cam.

As described above, a continuous variable valve duration system according to various exemplary embodiments of the present disclosure may vary an opening duration of a valve according to operation conditions of an engine, with a simple construction.

The continuous variable valve duration system according to various exemplary embodiments of the present disclosure may be reduced in size and thus the entire height of a valve train may be reduced.

Since the continuous variable valve duration system may be applied to an existing engine without excessive modification, thus productivity may be enhance and production cost may be reduced.

DETAILED DESCRIPTION

In the following detailed description, only certain exemplary embodiments of the present disclosure have been shown and described, merely by way of illustration.

As those skilled in the art would realize, the described embodiments may be modified in various different ways, all without departing from the spirit or scope of the present disclosure A part irrelevant to the description will be omitted to clearly describe the present disclosure, and the same or similar elements will be designated by the same reference numerals throughout the specification.

In the drawings, the thickness of layers, films, panels, regions, etc., may be exaggerated for clarity.

Throughout the specification and the claims, unless explicitly described to the contrary, the word "comprise" and variations such as "comprises" or "comprising" will be understood to imply the inclusion of stated elements but not the exclusion of any other elements.

Various exemplary embodiments of the present disclosure will hereinafter be described in detail with reference to the accompanying drawings.

Figure 1:
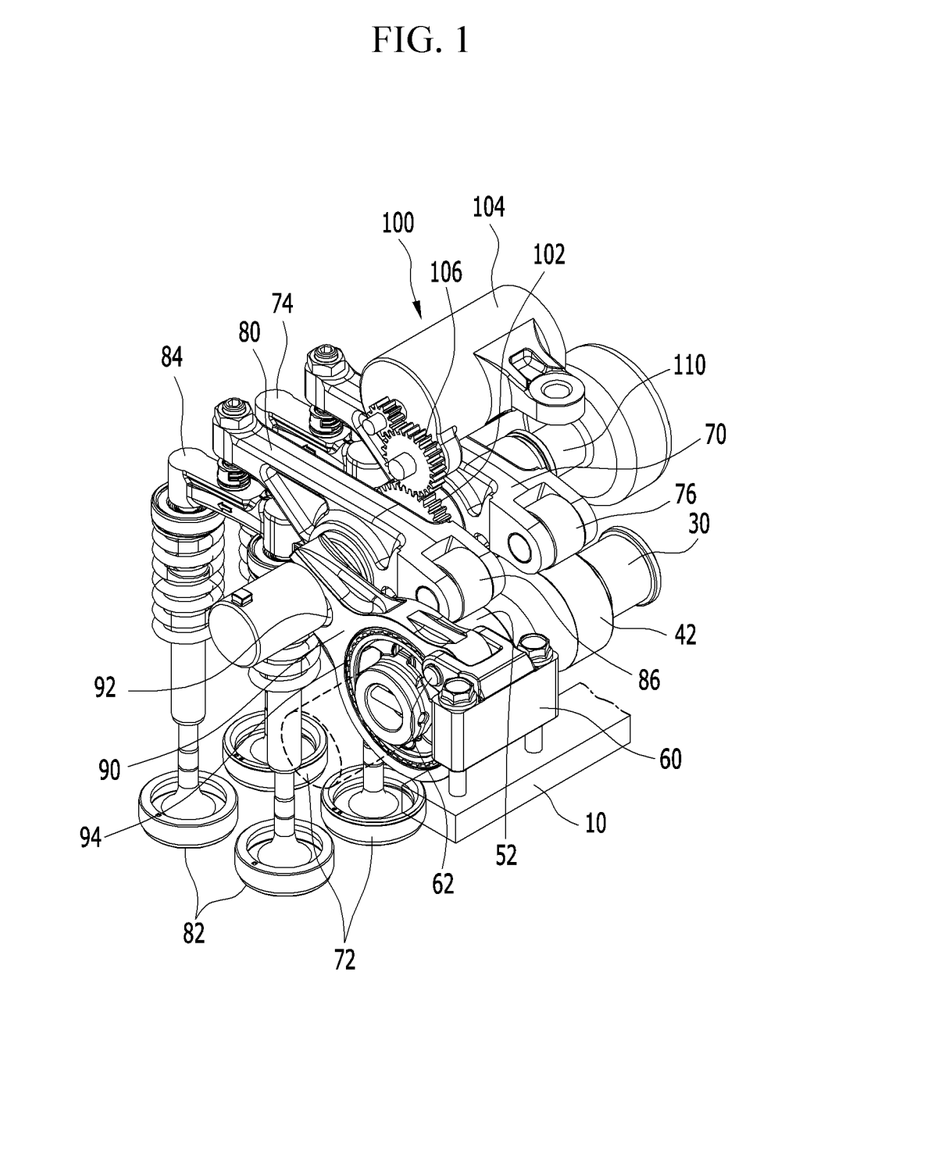
FIG. 1 is a perspective view of an engine provided with an exemplary continuous variable valve duration apparatus/system according to embodiments of the present disclosure.
Figure 2:
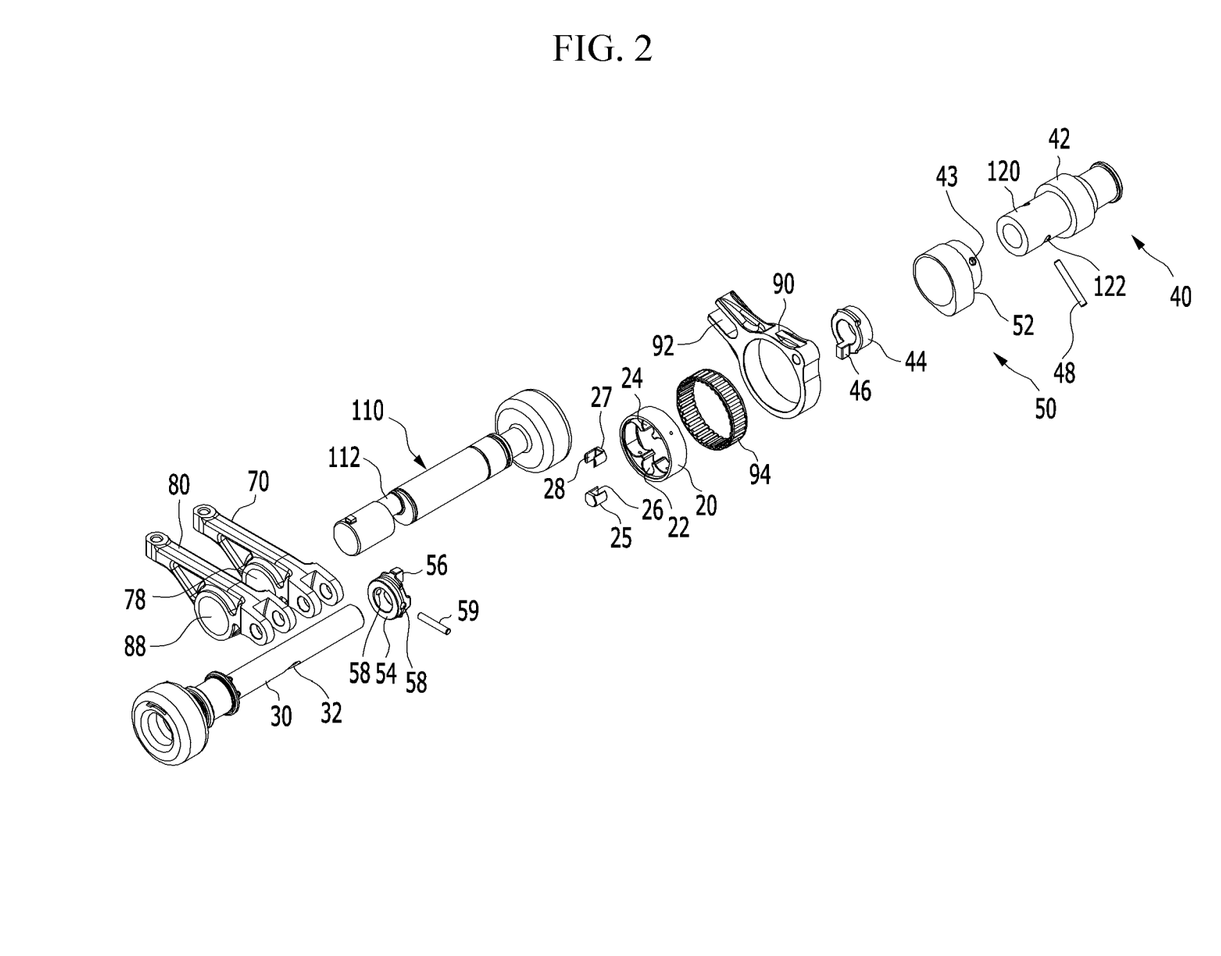
FIG. 2 is an exploded perspective view of an exemplary continuous variable valve duration system according to embodiments of the present disclosure.
Figure 3:
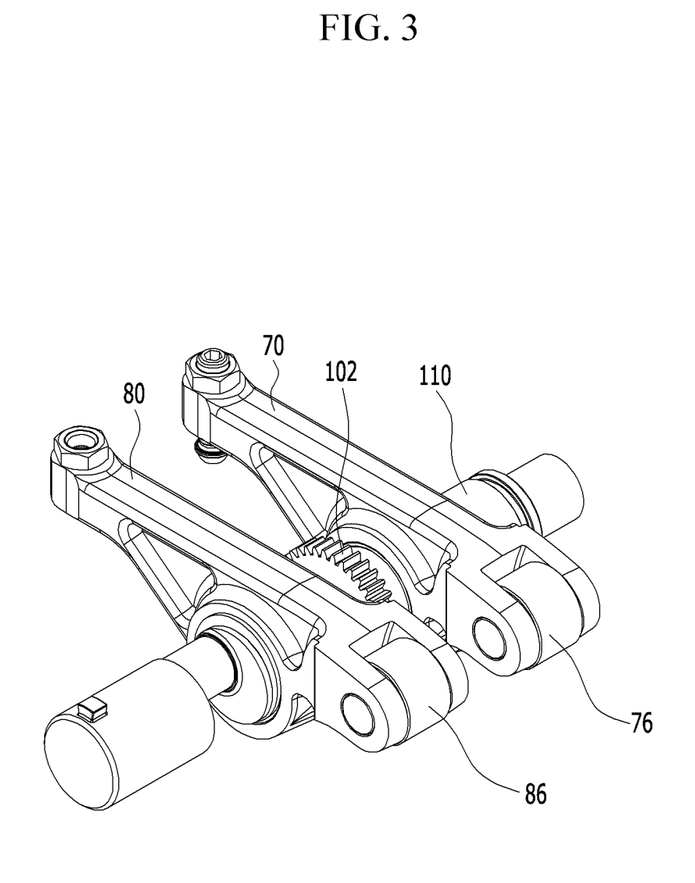
FIG. 3 is a partial perspective view of an exemplary continuous variable valve duration system according to embodiments of the present disclosure.

FIG. 1 is a perspective view of an engine provided with a continuous variable valve duration system according to various exemplary embodiments of the present disclosure, FIG. 2 is an exploded perspective view of a continuous variable valve duration system according to various exemplary embodiments of the present disclosure and FIG. 3 is a partial perspective view of an exemplary continuous variable valve duration system according to embodiments of the present disclosure.

Figure 4:
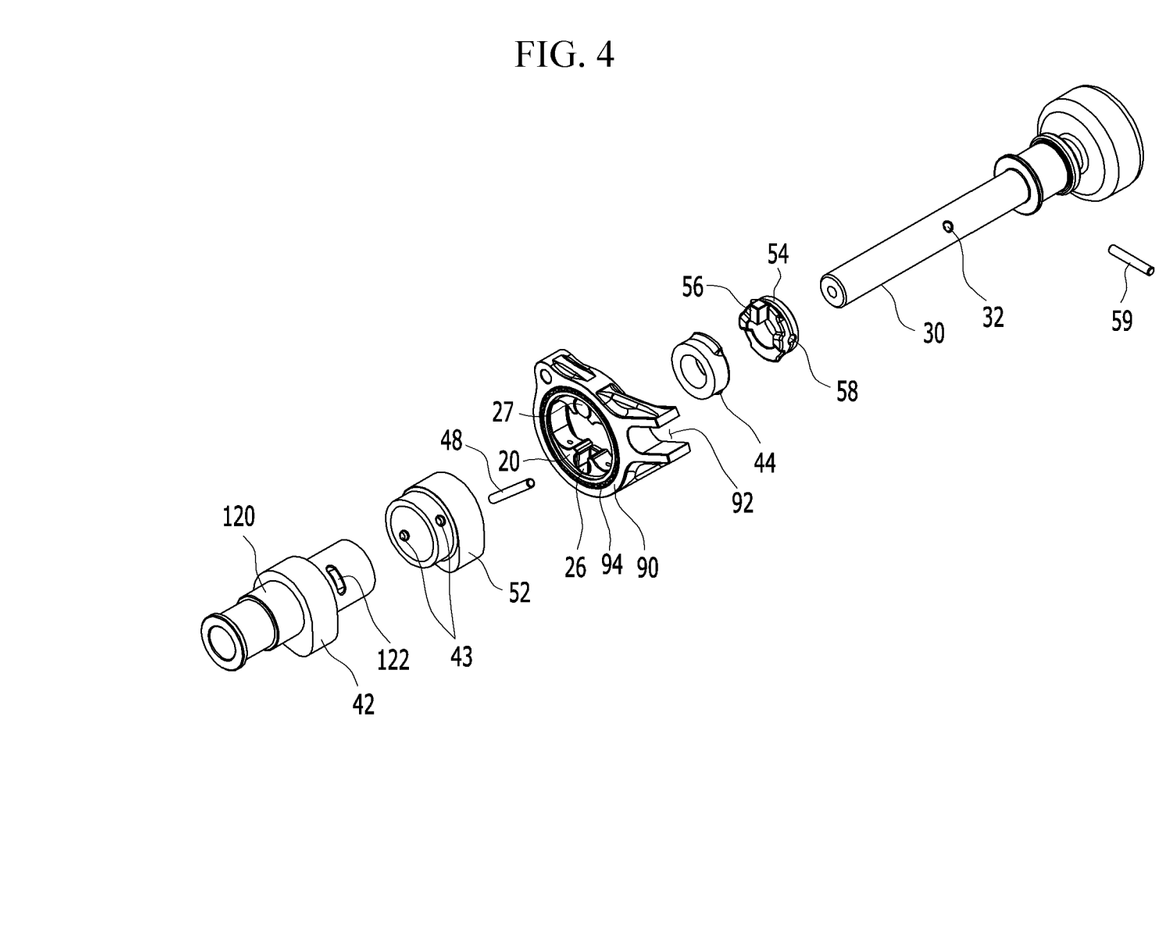
FIG. 4 is a partial exploded perspective view of an exemplary continuous variable valve duration system according to embodiments of the present disclosure.
Figure 5:
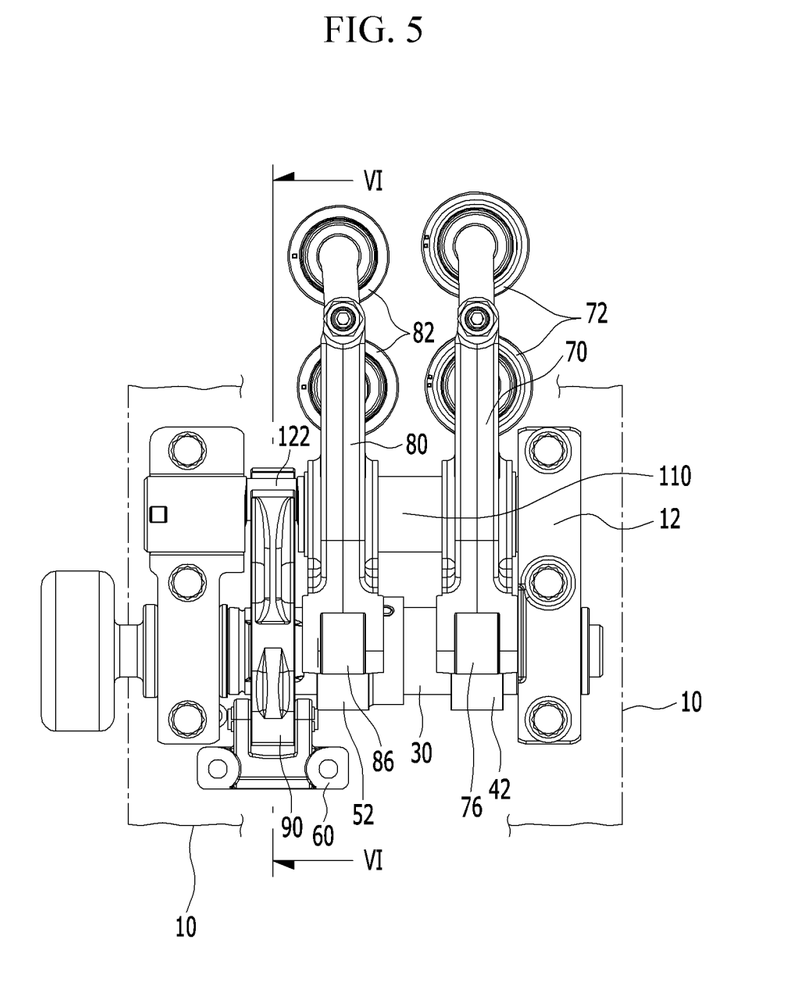
FIG. 5 is a top plan view of an exemplary continuous variable valve duration system according to embodiments of the present disclosure.
Figure 6A:
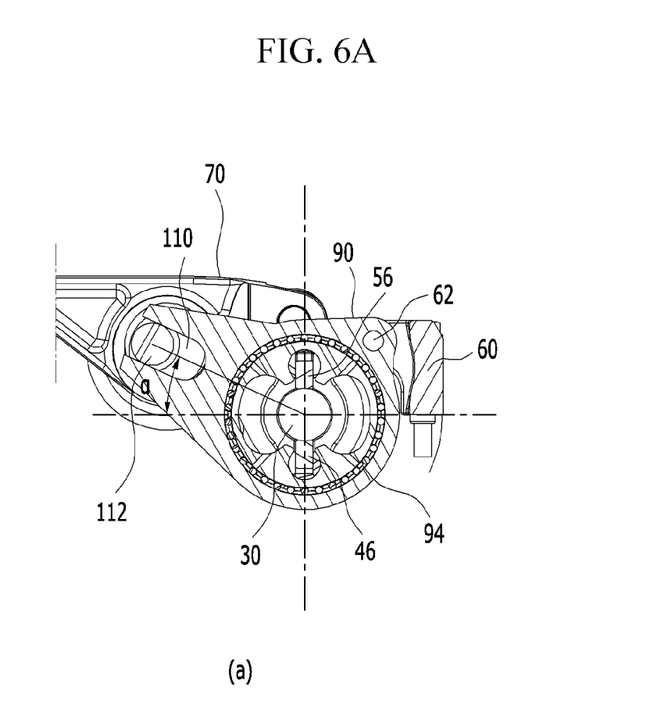
FIG. 6A is a cross-sectional view taken along line VI-VI of FIG. 5 showing a first position of operation.
Figure 6B:
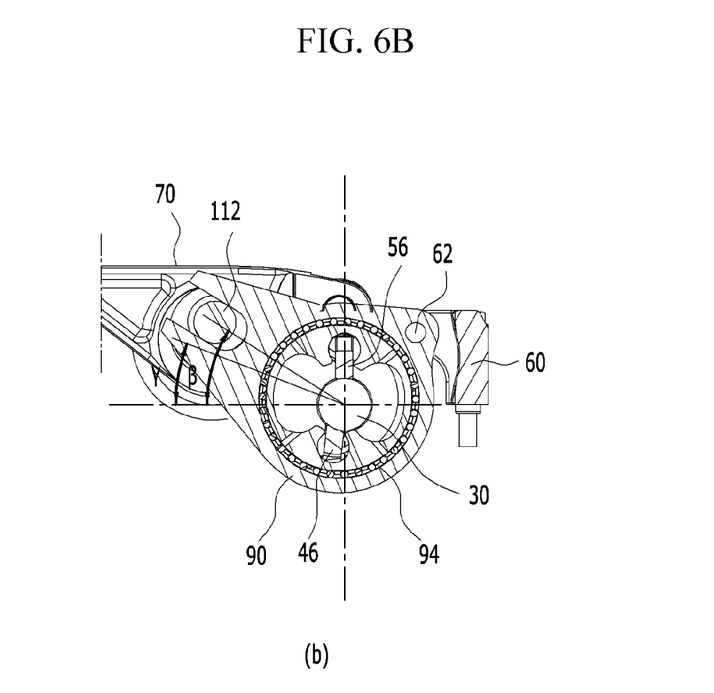
FIG. 6B is a cross-sectional view taken along line VI-VI of FIG. 5 showing a second position of operation.

FIG. 4 is a partial exploded perspective view of a continuous variable valve duration system according to various exemplary embodiments of the present disclosure, FIG. 5 is a top plan view of a continuous variable valve duration system according to various exemplary embodiments of the present disclosure and FIGS. 6A and 6B are cross-sectional views taken along line VI-VI of FIG. 5.

Referring to FIG. 1 to FIG. 6, an engine 10 according to various exemplary embodiments of the present disclosure may include a cylinder head 10 and a continuous variable valve duration system mounted to the cylinder head 10 through a cam cap 12.

The continuous variable valve duration system may include a camshaft 30, a first cam portion 40 including a first cam 42, into which the camshaft 30 is inserted and of which a relative phase angle of the first cam 42 with respect to the camshaft 30 is variable, an inner bracket 20 transmitting rotation of the camshaft 30 to the first cam portion 40, a slider housing 90 into which the inner bracket 20 is rotatably inserted, on which a control slot 92 is formed, and the slider housing 90 rotatable around a pivot shaft 62, a first rocker arm 70 of which a first end contacts with the first cam 42 and of which a second end is connected to a first valve 72, a rocker shaft 110 of which the first rocker arm 70 is rotatably connected thereto and of which an eccentric shaft 112 inserted into the control slot 92 is formed thereto and a control portion 100 configured to rotate the rocker shaft 110 for the slider housing 90 to be moved with respect to the camshaft 30.

The pivot shaft 62 is mounted to the cylinder head 10 though a mounting bracket 60 and in the detailed description and claims, the cylinder head 10 may include a cam carrier.

A first and a second slot 22 and 24 are formed to the inner bracket 20.

The first cam portion 40 may include a first wheel 44 on which a first wheel key 46 is formed.

A second wheel 54 on which a second wheel key 56 is formed is connected to the camshaft 30. A wheel key hole 58 is formed on the second wheel 54, a camshaft hole 32 is formed on the camshaft 30, a wheel key pin 59 is inserted into the wheel key hole 58 and the camshaft hole 32 and thus the second wheel 54 is connected to the camshaft 30.

A first slider pin 25, on which a first pin hole 26 where the first wheel key 46 may be slidably inserted thereto along a length direction of the wheel key 46, may be formed is rotatably inserted into the first slot 22. A second slider pin 27, on which a second pin hole 28 where the second wheel key 56 may be slidably inserted thereto along a length direction of the second wheel key 56 may be formed, may be rotatably inserted into the second slot 24.

A bearing 94 may be inserted between the slider housing 90 and the inner bracket 20. Thus, rotation of the inner bracket 20 may be easily performed.

The continuous variable valve duration system according to various exemplary embodiments of the present disclosure further may include a second cam portion 50 including a second cam 52 rotating with the same phase angle of the camshaft 30 and a second rocker arm 80 rotatably connected to the rocker shaft 110, a first end of which may contact the second cam 52 and a second end of which may be connected with a second valve 82.

The camshaft 30 may be inserted into an outer shaft 120 where a guide slot 122 may be formed along a circumference direction thereof, and the first wheel 44 is connected to the first cam 42 through the outer shaft 120.

The first cam 42 is connected to and rotated with the outer shaft 120.

A cam pin 48 may be connected to the second cam 52 and the cam pin 48 is inserted into the guide slot 122 for guiding rotation of the second cam 52. A cam hole 43 may be formed to the second cam 52, the cam pin 48 is connected to the cam hole 43 and the cam pin 48 may be movably inserted into the guide slot 122. Thus the second cam 52 is connected to the camshaft 30 through the guide slot 122 and may relatively rotate with respect to the outer shaft 120 along a circumference direction of the outer shaft 120.

A first rocker arm hole 78 may be formed to the first rocker arm 70, a second rocker arm hole 88 may be formed to the second rocker arm 80 and the rocker shaft 110 may be inserted into the first rocker arm hole 78 and the second rocker arm hole 88.

A first roller 76 contacting the first cam 42 may be connected to the first end of the first rocker arm 70 and a first bridge 74 may be connected to the second end of the first rocker arm 70.

Two first valves 72 may be connected to the first bridge 74.

A second roller 86 contacting the second cam 52 may be connected to the first end of the second rocker arm 80 and a second bridge 84 may be connected to the second end of the second rocker arm 80.

Two second valves 82 may be connected to the second bridge 80.

The continuous variable valve duration system according to various exemplary embodiments of the present disclosure may be applied to a Single Overhead Camshaft (SOHC) engine with light weight and with low driving resistance.

The control portion 100 may include a control gear 102 connected to the the rocker shaft 110 and a control motor 104 for selectively rotating the control gear 102. As shown in drawings, an intermediate gear 106 may be interposed between the control gear 102 and the control motor 104.

Figure 7:
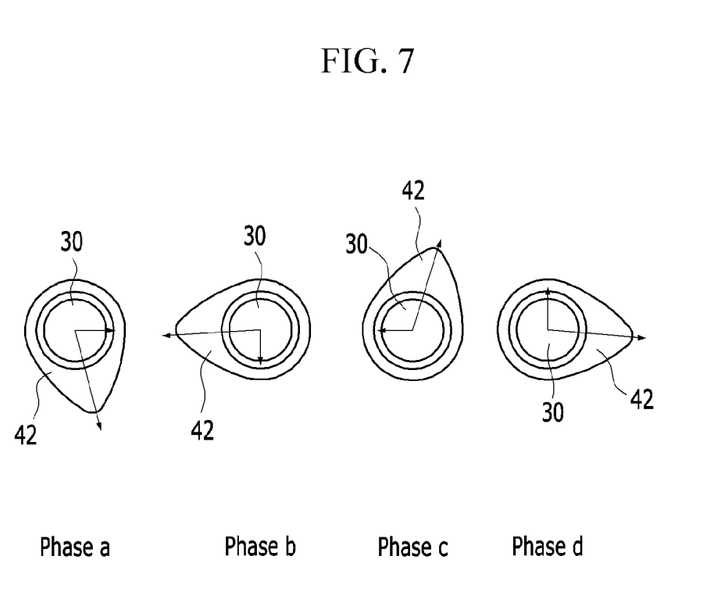
FIG. 7 and FIG. 8 are drawings showing mechanical motions of cams of an exemplary continuous variable valve duration system according to embodiments of the present disclosure.
Figure 8:
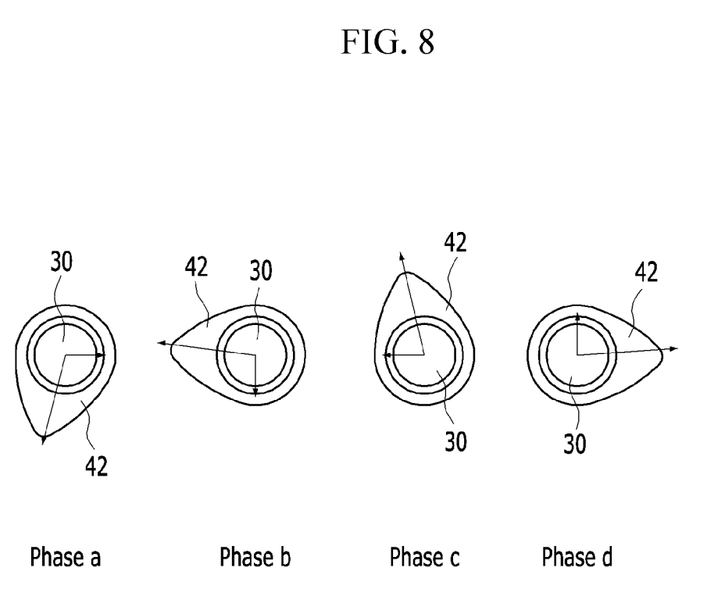

FIG. 7 and FIG. 8 are drawings showing mechanical motions of cams of an exemplary continuous variable valve duration system according to embodiments of the present disclosure.

Referring to FIG. 1 to FIG. 8, operations of the continuous variable valve duration system according to various aspects of the present disclosure will be discussed.

When rotation centers of the camshaft 30 and the inner bracket 20 are coincident, that is to say, an angle between a line passing the camshaft 30 and the eccentric shaft 112 and a base line X is a predetermined angle α as shown in FIG. 6A, the first cam 42 may rotate with the same phase angle of the camshaft 30. That is, the first cam 42 and the camshaft 30 may rotate with the same speed.

When the rotation centers of the camshaft 30 and the inner bracket 20 are not coincident according to operations of the control portion 100, that is to say, an angle between the line passing the camshaft 30 and the eccentric shaft 112 and the base line X is changed to an angle β or γ as shown in FIG. 6B, a rotation speed of the first cam 42 with respect to rotation speed of the camshaft 30 may be changed.

While the second wheel 54 is rotated together with the camshaft 30, the second wheel key 56 may be movable within the second pin hole 28, the second slider pin 27 and the first slider pin 25 may be rotatable within the second slot 24 and the first slot 22 respectively and the first wheel key 46 may be movable within the first pin hole 26. Thus when the rotation centers of the camshaft 30 and the inner bracket 20 are not coincident, the rotation speed of the first cam 42 with respect to the rotation speed of the camshaft 30 may be changed.

When the angle between the line passing the camshaft 30 and the eccentric shaft 112 and the base line X is changed to an angle γ according to operations of the control portion 100, a relative position of the inner bracket 20 with respect to the camshaft 30 may be changed downward.

As shown in FIG. 7, the rotation speed of the first cam 42 may be relatively faster than the rotation speed of the camshaft 30 from phase a to phase b and from phase b to phase c, and the rotation speed of the first cam 42 may be relatively slower than the rotation speed of the camshaft 30 from phase c to phase d and from phase d to phase a.

When the angle between the line passing the camshaft 30 and the eccentric shaft 112 and the base line X is changed to an angle β according to operations of the control portion 100, a relative position of the inner bracket 20 with respect to the camshaft 30 may be changed upward.

As shown in FIG. 8, the rotation speed of the first cam 42 may be relatively slower than a rotation speed of the camshaft 30 from phase a to phase b and from phase b to phase c, and the rotation speed of the first cam 42 may be relatively faster than a rotation speed of the camshaft 30 from phase c to phase d and from phase d to phase a.

According to the relative position of the inner bracket 20, timing of the first cam 42 to push the first roller 76, that is the timing that the first valve 72 is opened or closed, may be changed.

FIG. 9 to FIG. 12 are graphs of a valve profile of an exemplary continuous variable valve duration system according to embodiments of the present disclosure.

An exemplary continuous variable valve duration system of the present disclosure may perform various valve profiles according to contacting positions of the first cam 42 and the first roller 76, mounting angle of the first cam 42 and the first roller 76 and so on.

Figure 9:
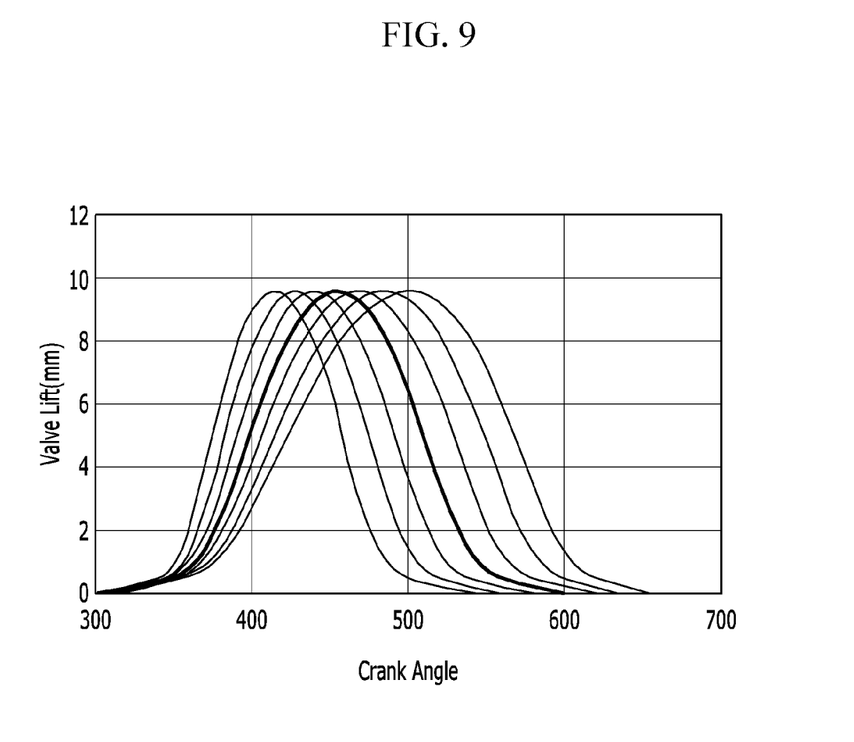
FIG. 9 to FIG. 12 are graphs of a valve profile of an exemplary continuous variable valve duration system according to embodiments of the present disclosure.
Figure 10:
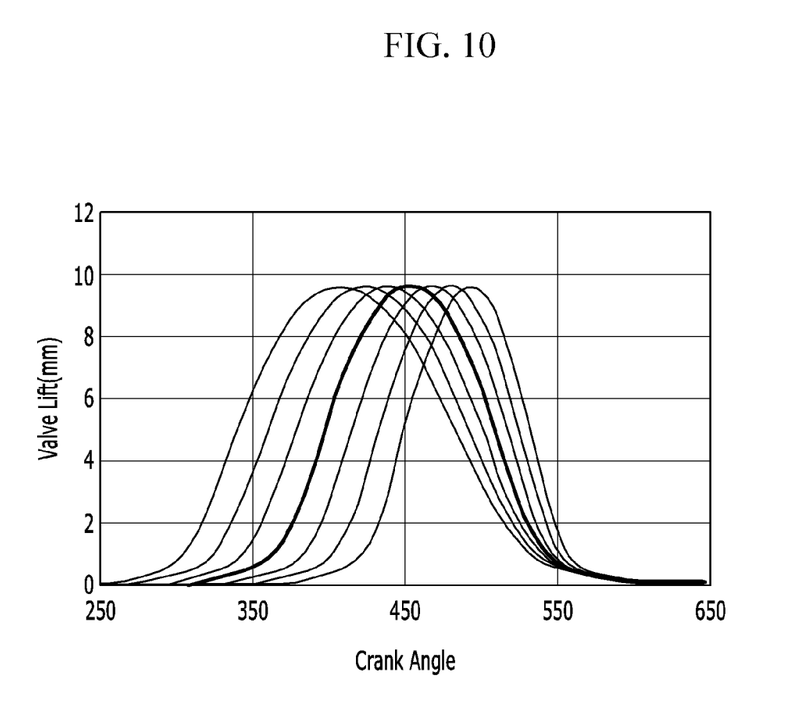

As shown in FIG. 9, an opening time of the first valve 72 may be fixed while a closing time of the first valve 72 is changed. Or, the opening time of the first valve 72 may be changed while the closing time of the first valve 72 is fixed as shown in FIG. 10.

Figure 11:
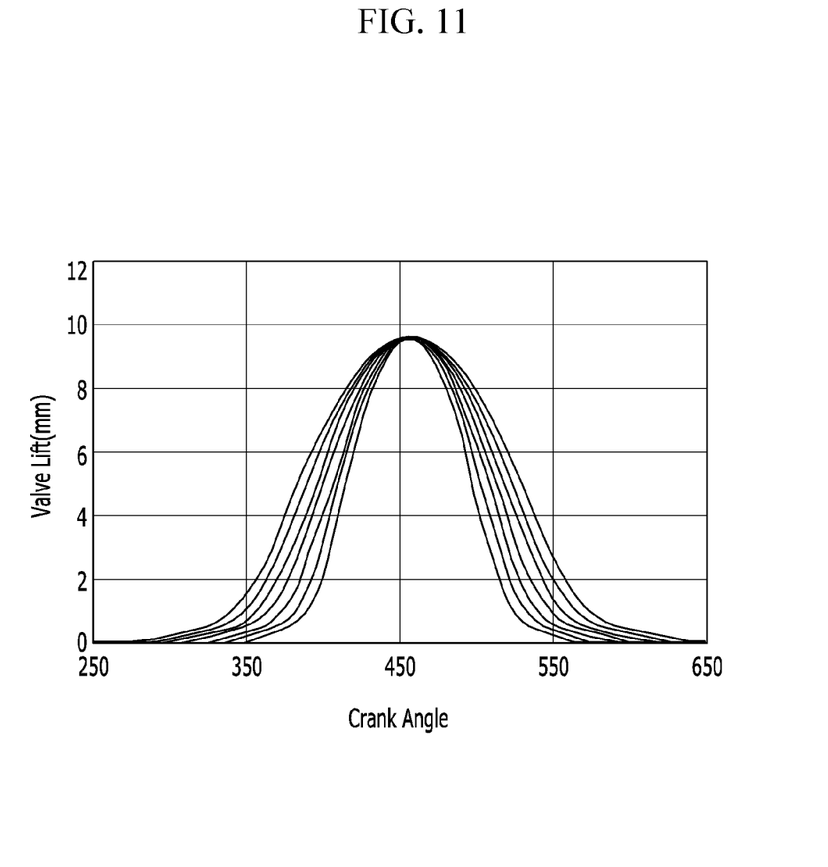
Figure 12:
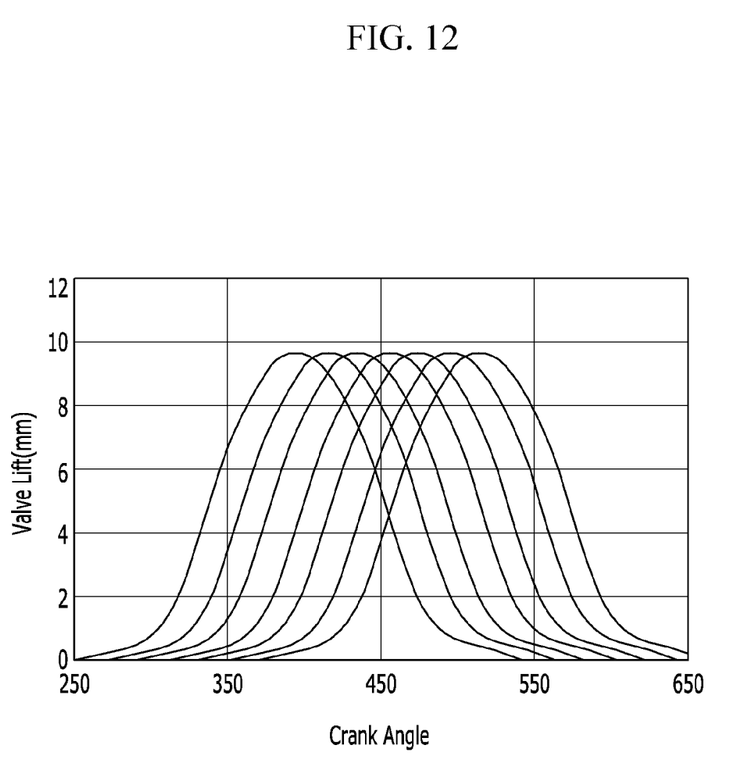

As shown in FIG. 11, a peak time of the first valve 72 may be fixed while a duration of the first valve 72 is changed. Or a closing time and an opening time of the first valve 72 is simultaneously changed as shown in FIG. 12.

As described above, the continuous variable valve duration system according to various exemplary embodiments of the present disclosure may vary an opening duration of a valve according to operation conditions of an engine, with a simple construction.

The continuous variable valve duration system according to various exemplary embodiments of the present disclosure may be reduced in size and thus the entire height of a valve train may be reduced.

Since the continuous variable valve duration system may be applied to an existing engine without excessive modification, thus productivity may be enhanced and production costs may be reduced.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A continuous variable valve duration system comprising:
   a camshaft;
   a first cam portion including a first cam, into which the camshaft is inserted and of which a relative phase angle of the first cam with respect to the camshaft is variable;
   an inner bracket for transmitting rotation of the camshaft to the first cam portion;
   a slider housing into which the inner bracket is rotatably inserted, on which a control slot is formed, and the slider housing being rotatable around a pivot shaft;
   a first rocker arm of which a first end contacts with the first cam and of which a second end is connected to a first valve;
   a rocker shaft of which the first rocker arm is rotatably connected thereto and of which an eccentric shaft inserted into the control slot is formed thereto; and
   a control portion for rotating the rocker shaft for the slider housing to be moved with respect to the camshaft.

2. The continuous variable valve duration system of claim 1, wherein a first and a second slot are formed in the inner bracket, and
   the first cam portion comprises a first wheel on which a first wheel key is formed and connected to the first cam, and
   wherein the continuous variable valve duration system further comprises:
   a second wheel on which a second wheel key is formed and connected to the camshaft;
   a first slider pin on which a first pin hole where the first wheel key is slidably inserted thereto along a length direction of the first wheel key is formed and the first slider pin is rotatably inserted into the first slot; and
   a second slider pin on which a second pin hole where the second wheel key is slidably inserted thereto along a length direction of the second wheel key is formed and the second slider pin is rotatably inserted into the second slot.

3. The continuous variable valve duration system of claim 2, further comprising a bearing disposed between the slider housing and the inner bracket.

4. The continuous variable valve duration system of claim 2, wherein the control portion comprises:
   a control gear connected to the rocker shaft; and
   a control motor for selectively rotating the control gear.

5. The continuous variable valve duration system of claim 2, further comprising a first bridge connected to the second end of the first rocker arm,
   wherein two first valves are connected to the first bridge.

6. The continuous variable valve duration system of claim 2, further comprising a first roller connected to the first end of the first rocker arm and contacting the first cam.

7. The continuous variable valve duration system of claim 2, further comprising an outer shaft into which the camshaft is inserted,
   wherein the first cam is connected to the outer shaft.

8. The continuous variable valve duration system of claim 2, further comprising:
   a second cam portion including a second cam rotating with the same phase angle as the camshaft; and
   a second rocker arm rotatably connected to the rocker shaft, a first end of which contacts the second cam and a second end which is connected to a second valve.

9. The continuous variable valve duration system of claim 8, further comprising a second bridge connected to the second end of the second rocker arm, wherein two second valves are connected to the second bridge.

10. The continuous variable valve duration system of claim 9, further comprising a second roller connected to the first end of the second rocker arm and contacting the second cam.

11. The continuous variable valve duration system of claim 8, further comprising an outer shaft on which a guide slot is formed and into which the camshaft is inserted, and
wherein a cam pin is connected to the second cam and the cam pin is inserted into the guide slot for guiding a rotation of the second cam, and
the first cam is connected to the outer shaft.

12. An engine comprising:
a camshaft;
a first cam portion including a first cam, into which the camshaft is inserted and of which a relative phase angle of the first cam with respect to the camshaft is variable;
an inner bracket for transmitting rotation of the camshaft to the first cam portion;
a slider housing into which the inner bracket is rotatably inserted, on which a control slot is formed, and the slider housing being rotatable around a pivot shaft mounted to a cylinder head;
a first rocker arm of which a first end contacts with the first cam and of which a second end is connected to a first valve;
a rocker shaft of which the first rocker arm is rotatably connected thereto and of which an eccentric shaft inserted into the control slot is formed thereto; and
a control portion for rotating the rocker shaft for the slider housing to be moved with respect to the camshaft.

13. The engine of claim 12, wherein a first and a second slot are formed on the inner bracket, and
the first cam portion comprises a first wheel on which a first wheel key is formed and connected to the first cam,
wherein the engine further comprises:
a second wheel on which a second wheel key is formed and connected to the camshaft;
a first slider pin on which a first pin hole where the first wheel key is slidably inserted thereto along a length direction of the first wheel key is formed and the first slider pin is rotatably inserted into the first slot; and
a second slider pin on which a second pin hole where the second wheel key is slidably inserted thereto along a length direction of the second wheel key is formed and the second slider pin is rotatably inserted into the second slot.

14. The engine of claim 13, further comprising a bearing disposed between the slider housing and the inner bracket.

15. The engine of claim 13, wherein the control portion comprises:
a control gear connected to the rocker shaft; and
a control motor for selectively rotating the control gear.

16. The engine of claim 13, further comprising a first bridge connected to the second end of the first rocker arm,
wherein two first valves are connected to the first bridge.

17. The engine of claim 13, further comprising an outer shaft on which a guide slot is formed and into which the camshaft is inserted, and
Wherein the first cam is connected to the outer shaft.

18. The engine of claim 17, further comprising:
a second cam portion including a second cam connected to the camshaft through the guide slot; and
a second rocker arm rotatably connected to the rocker shaft, a first end of which contacts the second cam and a second end which is connected to a second valve.

19. The engine of claim 18, further comprising a second bridge connected to the second end of the second rocker arm,
wherein two second valves are connected to the second bridge.

20. The engine of claim 19, further comprising:
a first roller connected to the first end of the first rocker arm and contacting the first cam; and
a second roller connected to the first end of the second rocker arm and contacting the second cam.

\* \* \* \* \*